July 3, 1923.  1,460,748
H. DORNSEIF
MEANS FOR PREVENTING FOWL FROM ESCAPING
Filed June 9, 1922
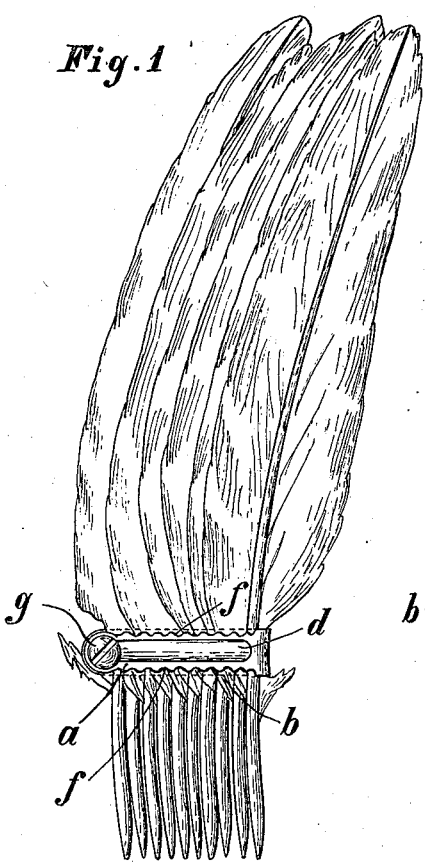
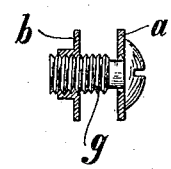
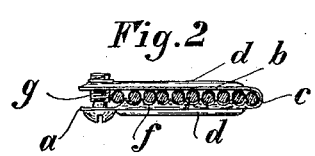
Inventor:
Hugo Dornseif Patented July 3, 1923.

1,460,748

UNITED STATES PATENT OFFICE.

HUGO DORNSEIF, OF BERGERHOF, GERMANY.

MEANS FOR PREVENTING FOWL FROM ESCAPING.

Application filed June 9, 1922. Serial No. 567,215.

*To all whom it may concern:*

Be it known that I, HUGO DORNSEIF, a citizen of Germany, residing at Bergerhof, Rheinland, Germany, have invented certain new and useful Improvements in Means for Preventing Fowl from Escaping (for which I have filed an application in Germany April 4, 1921), of which the following is a specification.

My invention has reference to means for the prevention of the flying away and the escape of fowl or poultry of any kind, and it is particularly intended to provide a fetter for the birds which will not substantially interfere with the freedom of movement of the same. Other objects and advantages of my invention will appear as the description proceeds.

In the devices of this kind heretofore employed it was intended to attain the object desired of preventing the escape of the birds by causing the wings of the birds to be secured in the bending position so as to prevent spreading of the wings altogether. These means rendered the birds altogether unable to perform flying movements and thus interfered with the freedom of movement to such an extent that the birds could only move with difficulty with the result, that the health of the birds was impaired, and in the case of young fowl the growth of the same was checked. Fetters of this kind, as heretofore employed, were ordinarily formed of straps of leather or metal bands which had to be applied around the wing members in the bent position thereof. The positioning of devices of this kind was very difficult in view of the fact that the struggling bird in the natural desire of trying to escape makes very strong efforts to cause its wings to again assume the expanded position. Then there is the inconvenience that, in the case of fetters made from metal bands, these will always come into direct contact with or into the skin, and causing sores and injuries and inflammation of the cellular tissues by constant rubbing irritation and pressure. Furthermore in the case of fetters made from straps of leather to be applied to the wings exteriorly there is the drawback of their becoming exposed and visible, and of being easily slipped off, unless very carefully seated.

In accordance with the present invention I dispense with the necessity of securing the parts of the wings in the bent position, but instead of that I provide means for uniting edge or pinion feathers of the wing, that is to say the feathers of the hand bones, the carpal and metacarpal feathers; in accordance therewith the fetter according to my invention consists of a two-legged clamp the free ends of which are adapted to be drawn against each other by a tensioning or tightening appliance.

Clamping means constructed in accordance with my invention and adapted to be applied to the pinions or carpal, meta-carpal and digital feathers differ very materially in operation from the fetters as heretofore constructed. The spreading of the wings is not interfered with, but the pinion feathers are so closely assembled that in the expansion of the wings a comparatively large aperture is provided between the feathers of the hand and those of the lower arm, by which means the supporting surface of the wing is diminished to such an extent that the bird is able to raise itself but very slightly above the ground. Thus, the improved device according to this invention reduces the flying capacity only to such on extent that flying over high fences or enclosures is rendered impossible, while, on the other hand, the utilization of the wings, and the consequent freedom of movement of the fowl is not completely prevented, the birds being still capable of enjoying great freedom of movement, and their growth is not interfered with at all. By the partial retaining of the use of the wings the birds are also enabled to move quickly and to save themselves when fleeing from dogs, hawks or other dangers, a point of importance inasmuch as this is absolutely impossible in the case of the fetters above referred to as heretofore constructed.

The new clamp in accordance with my invention does not come into contact at all with the members of the wing, so that any lesion or sore to the members such as is liable to occur in the case of fetters as previously constructed, is entirely obviated. On the other hand the device according to this invention is of very light weight and can be readily applied in view of the fact that, instead of the wing members in the bending position, it is only the feathers of the hand bones which are secured in the clamp, which may be effected in the expanded position of the wings. The device is also particularly distinguished by its great simplicity of construction, its low price, and by the fact that in case of emergency that is to say, during the moulting period or for killing the bird, the fetter may be easily detached and may be used over again. In order to securely seat the clamp in position one or both legs thereof are indented or scalloped or provided with transverse grooves upon their clamping surfaces, so that the stems of the pinion or edge feathers are retained against displacement between the teeth or projections simultaneously engaging between the beards of the feathers, without, however, causing any lesion of the wing stems. As a tightening means I may use a screw bolt engaging in the corresponding hole of the end of one of the legs and adapted to be screwed fast in a threaded hole of the end of the other leg. In order to prevent loss of the screw in the inoperative position of the clamp the diameter of the threaded front part of the screw stem is larger than that of the unthreaded rear portion, while the corresponding holes of the end portions of the legs are threaded. The threaded portion of the screw stem is screwed through the female part of one leg portion so that the underthreaded stem portion of smaller diameter enters this hole, the screw being freely rotatable in this leg, though it is secured against dropping out by the thickened threaded portion of the stem.

Both legs of the clamp may be made from a single strip of sheet metal, the legs being preferably stiffened by fluted or fin-like portions produced by pressing.

The invention is shown by way of example in an embodiment of the same in a conventional manner on the accompanying drawing, Figure 1 being a top plan view with edge or pinion feathers secured in the clamp, while Figure 2 is a side view showing the quills of the feathers in section in the clamped position, Figure 3 is a cross section through the free ends of the legs of the clamp.

The fetter as constructed in accordance with this invention is substantially constituted by a two-legged clamp the legs $a$, $b$ of which are jointed or pivotally connected with each other at $c$. The clamp may preferably be formed from a U-shaped strip of sheet metal which has its outer ends stiffened by longitudinal ribs, fins or the like $d$, $d$, produced by pressing the material, while the part $c$ is readily flexible so as to be able to open and close the clamp. The longitudinal edges of one of the legs, $a$ for instance, are turned inwards and provided with a plurality of serrations, teeth or indentations $f$, $f$ which are similarly provided on both longitudinal edges. The free spaces between the serrations or teeth $f$, $f$ are preferably provided with a cup-shaped or semicircular bottom:

The free end portions of the legs are apertured, showing each a hole for the reception of the head screw or screw bolt $g$ adapted to enter the hole of the leg $a$, and to be threadedly secured in the interiorly threaded hole of the other leg $b$, the said hole being provided with an outwardly projecting neck-shaped rim. By this means the two legs of the clamps may be tightly united to each other.

In order to prevent loss of the screw $g$ the front threaded portion of the screw stem is preferably of larger diameter than the unthreaded rear portion of the same, which may be easily accomplished by producing the threads by a suitable rolling process. The hole at the free end of the leg $a$ is also provided with an inner thread, and the threaded portion of the screw stem is engaged therein so that the unthreaded portion of the stem is lodged within the hole. The screw is then freely rotatable, though secured against dropping out.

The novel device is applied by first placing the edge or pinion feathers of the wing or the majority of the same, say about ten feathers, as shown in the example, between the opened legs of the clamp, which is then closed, the screw $g$ being thereupon sufficiently tightened to retain the feathers in the clamp. Each wing is, of course, provided with a clamp. The bird, while still enabled to spread its wings, will be unable to produce the supporting surface required for flying over fences or enclosures. Obviously, the arrangement of the serrations, teeth or projections $f$, $f$, and of the grooves or interstices or spaces is such as to avoid lesion of the quills of the feathers, without interfering with the position of the clamp which is securely retained against displacement.

It is obvious that my invention is not limited to the embodiment shown by way of example in the drawing, and many modifications of the same will suggest themselves to the user and those skilled in the art to which it appertains; thus among other modifications to be resorted to, as the convenience of the user or of the manufacturer may direct, I may mention that both legs $a$, $b$ of the clamp may be made integral or made of two different pieces which may be hingedly connected to each other. Instead of using a screw $g$ any other suitable tightening means may be employed, thus for instance, a pair of flexible pincers or pair of tongs provided on one of the legs, and engaging with a slot of the other leg, and which is then locked in position by being bent outwards. This construction being obvious is not shown in the drawing.

I claim:

1. A fowl fetter comprising in combination, a two-legged sheet metal clamp, the legs being connected at one end, means for connecting and fixing the free ends of said legs and a row of serrations on the inner side of a leg, each adapted to hold a single quill.

2. Fowl fetter comprising in combination, a two-legged sheet metal clamp, the legs being connected at one end, means for connecting and fixing the free ends of said legs, lateral longitudinal flanges on one leg extending towards the other leg and a row of serrations on the inner edge of said flanges.

3. Fowl fetter comprising in combination, a two-legged sheet metal clamp, the legs being connected at one end, a row of serrations on the inner side of a leg, each adapted to hold a quill, a threaded annular flange surrounding a hole in the free end of a leg and a screw extending through a hole in the free end of the other leg and into said threaded flange.

4. Fowl fetter comprising in combination, a two-legged sheet metal clamp, the legs being connected at one end, a row of serrations on the inner side of a leg, each adapted to hold a quill, a threaded annular flange surrounding a hole in the free end of a leg and a screw extending through a hole in the free end of the other leg and into said threaded flange, the threaded portion of said screw being of larger diameter than the latter hole.

5. A fowl fetter comprising in combination, a substantially U-shaped clamp, substantially parallelly spaced flexible leg portions on said clamp, inwardly turned registering serrated longitudinal edges on said leg portions and tightening means for said leg portions.

In testimony whereof I affix my signature.

HUGO DORNSEIF.